US009950661B2

United States Patent
Udo et al.

(10) Patent No.: US 9,950,661 B2
(45) Date of Patent: Apr. 24, 2018

(54) LIGHT SOURCE UNIT AND VEHICULAR ROOM LIGHT

(71) Applicant: HONDA MOTOR CO., LTD., Tokyo (JP)

(72) Inventors: Takeshi Udo, Wako (JP); Kenichi Takizawa, Wako (JP); Yoshiaki Hirato, Wako (JP); Naoki Nakanishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/202,052

(22) Filed: Jul. 5, 2016

(65) Prior Publication Data
US 2017/0001555 A1    Jan. 5, 2017

(30) Foreign Application Priority Data

Jul. 3, 2015    (JP) .................................. 2015-134093

(51) Int. Cl.
*F21V 7/04*    (2006.01)
*B60Q 3/74*    (2017.01)
(Continued)

(52) U.S. Cl.
CPC ................. *B60Q 3/74* (2017.02); *B60Q 3/51* (2017.02); *B60Q 3/64* (2017.02)

(58) Field of Classification Search
CPC .... F21S 48/212; F21S 48/215; F21S 48/1109; F21S 48/1154; B60J 5/101; B60J 5/107;
(Continued)

(56) References Cited

U.S. PATENT DOCUMENTS 6,441,022 B1 * 8/2002 Frick .................... C08G 65/329
514/431
2015/0015713 A1 * 1/2015 Wang ..................... H04N 5/235
348/148
(Continued)

FOREIGN PATENT DOCUMENTS

JP    7-167681 A    7/1995
JP    2005-075316 A    3/2005
(Continued)

OTHER PUBLICATIONS

Office Action dated Mar. 7, 2017, issued in counterpart Japanese Patent Application No. 2015-134093, with machine translation. (8 pages).

*Primary Examiner* — Thien M Le
(74) *Attorney, Agent, or Firm* — Westerman, Hattori, Daniels & Adrian, LLP

(57) ABSTRACT

A light source unit including a light source that emits light into a vehicle interior through a lens of a room light, a substrate on which the light source is mounted, the substrate being mounted on a base member of the room light, an engagement portion that engages with, among a plurality of mounting seats that are provided on the base member and that have different protrusion heights, an upper side mounting seat, the engagement portion being provided on the substrate and on a circumference of an imaginary circle formed about the light source, and a clearance portion that is capable of avoiding interference with, among the plurality of mounting seats, a lower side mounting seat, the clearance portion being provided in the substrate and on the circumference of the imaginary circle formed about the light source.

7 Claims, 6 Drawing Sheets

(51) Int. Cl.
*B60Q 3/51* (2017.01)
*B60Q 3/64* (2017.01)

(58) Field of Classification Search
CPC ........ B60N 3/101; B60Q 1/2696; B60Q 3/20; B60Q 3/66; B60Q 3/74; B60Q 3/76
USPC .......................................................... 362/549
See application file for complete search history.

(56) References Cited

U.S. PATENT DOCUMENTS

| | | | | |
|---|---|---|---|---|
| 2016/0046233 | A1* | 2/2016 | Hansen | B60N 3/101 362/509 |
| 2016/0121789 | A1* | 5/2016 | Moon | B60Q 3/82 362/514 |
| 2016/0332510 | A1* | 11/2016 | Kinnou | B60J 5/101 |
| 2017/0023201 | A1* | 1/2017 | Hino | F21S 48/328 |

FOREIGN PATENT DOCUMENTS

| | | |
|---|---|---|
| JP | 2009-43968 A | 2/2009 |
| JP | 2009-265423 | 11/2009 |
| JP | 2012-126362 A | 7/2012 |

\* cited by examiner

LIGHT SOURCE UNIT AND VEHICULAR ROOM LIGHT

CROSS REFERENCES TO RELATED APPLICATIONS

The present application claims priority under 35 U.S.C. § 119 to Japanese Patent Application No. 2015-134093, filed Jul. 3, 2015, entitled "Light Source Unit and Vehicular Room Light." The contents of this application are incorporated herein by reference in their entirety.

BACKGROUND

1. Field

The present disclosure relates to a light source unit and a vehicular room light.

2. Description of the Related Art

As a vehicular room light (hereinafter, merely referred to as a room light) for illuminating a vehicle interior, a so-called ambient lighting that spotlights only a predetermined irradiation area inside the vehicle interior is known (see Japanese Unexamined Patent Application Publication No. 2005-75316, for example). Such a room light mainly includes a light source, such as an LED, a substrate on which the light source is mounted, a base member on which the substrate is fixed, and lens that transmits light emitted from the light source and that emits the light towards the irradiation area inside the vehicle interior.

SUMMARY

Incidentally, in the room light described above, the location, the irradiation area, and the like of the room light differ by vehicle types and the colors of the lighting. Accordingly, in order to reliably illuminate the irradiation area, the relative position and the like between the lens and the light source need to be optimized in accordance with the difference in the location and the irradiation area.

However, in order to optimize the distance between the lens and the light source, base members with different heights and lenses with different thicknesses need to be additionally prepared according to the location and the irradiation area described above. Accordingly, there is still room for improvement that achieves improvement in product marketability while achieving a reduction in cost.

The present disclosure has been made in view of the above situation and describes a light source unit of a vehicular room light that is capable of improving product marketability while achieving a reduction in cost.

In order to provide the above light source unit, in a first aspect of the disclosure, a light source unit includes a light source (a light source 51 in one of the exemplary embodiments, for example) that emits light into a vehicle interior (a vehicle interior C in one of the exemplary embodiments, for example) through a lens (a lens 22 in one of the exemplary embodiments, for example) of a vehicular room light (a room light 12 in one of the exemplary embodiments, for example), a substrate (a substrate 52 in one of the exemplary embodiments, for example) on which the light source is mounted, the substrate being mounted on a base member (a base member 23 in one of the exemplary embodiments, for example) of the vehicular room light, an engagement portion (an engagement portion 55 in one of the exemplary embodiments, for example) that engages with, among a plurality of mounting seats (mounting seats 45 and 46 in one of the exemplary embodiments, for example) that are provided on the base member and that have different protrusion heights, a first mounting seat, the engagement portion being provided on the substrate and on a circumference of an imaginary circle (an imaginary circle L in one of the exemplary embodiments, for example) formed about the light source, and a clearance portion (a clearance portion 58 in one of the exemplary embodiments, for example) that is capable of avoiding interference with, among the plurality of mounting seats, a second mounting seat that is a mounting seat other than the first mounting seat, the clearance portion being provided in the substrate and on the circumference of the imaginary circle formed about the light source.

In a second aspect of the disclosure, the engagement portion may be formed as a long hole (an elongated hole) in which a direction of a major axis of the long hole is a radial direction of the imaginary circle.

In a third aspect of the disclosure, a light source unit includes a light source that emits light into a vehicle interior through a lens of a vehicular room light, a substrate on which the light source is mounted, the substrate being mounted on a base member, and a plurality of mounting seats that have different protrusion heights being disposed so as to be spaced apart from each other on the substrate and on an imaginary circle formed about the light source. In the light source unit, among the mounting seats, a first mounting seat is engaged with an engagement portion provided on the base member, and a second mounting seat, the second mounting seat being a mounting seat other than the first mounting seat, is disposed at a position that overlaps, in a height direction, a clearance portion provided in the base member such that the second mounting seat is capable of avoiding interference with the base member.

In a fourth aspect of the disclosure, a vehicular room light includes the light source unit of the present disclosure described above.

According to the first and third aspect of the disclosure described above, by selecting, among the mounting seats, a mounting seat that is engaged with the engagement portions, a height in which the light source unit is fitted with respect to the base member can be adjusted without changing the light source unit. Furthermore, by adjusting the height in which the light source unit is fitted to the base member, the relative position between the lens and the light source can be adjusted. With the above, even when the location and the irradiation area of the vehicular room light are different due to the difference in vehicle type and in the color of the lighting, the light source unit can be used commonly. As a result, while achieving a reduction in cost, product marketability can be improved.

According to the second aspect of the disclosure, since the engagement portion is formed as a long hole in which the direction of the major axis is the radial direction of the imaginary circle, positional displacement of the light source unit in the radial direction with respect to the base member can be tolerated.

According to the fourth aspect of the disclosure, since the vehicular room light of the disclosure includes the light source unit described above, even when the location and the irradiation area of the vehicular room light are different, the light source unit and the base member can be used commonly. As a result, while achieving a reduction in cost, product marketability can be improved.

DESCRIPTION OF THE PREFERRED EMBODIMENTS

Exemplary embodiments of the present disclosure will be described next with reference to the drawings. In the following description, unless specifically stated, directions, such as front, rear, up, down, left, right are the same as those of the vehicle. Furthermore, in each drawing, arrow UP indicates the upward direction and arrow FR indicates the frontward direction.

First Exemplary Embodiment

Figure 1:
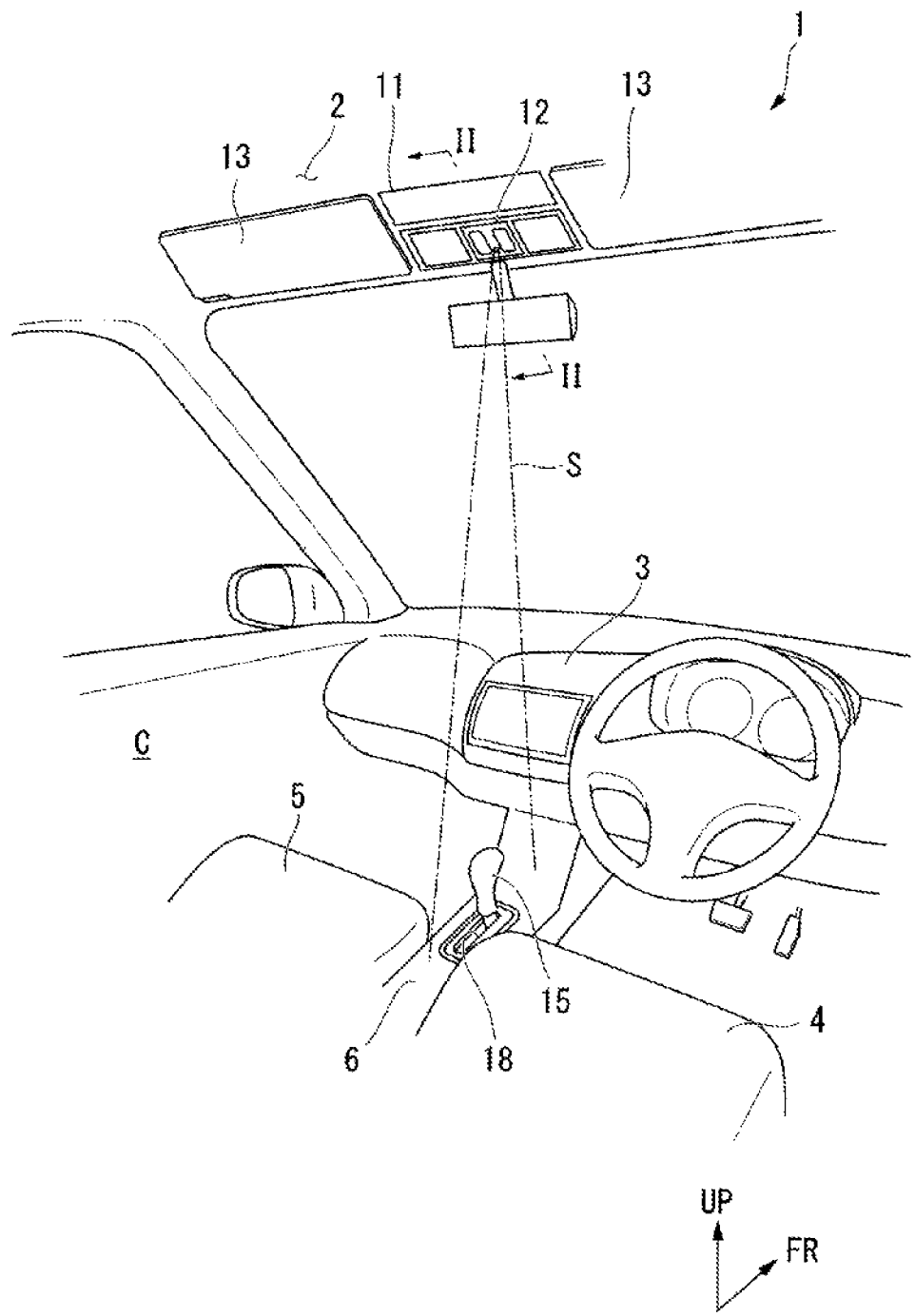
FIG. 1 is a perspective view of a vehicle interior of a vehicle including a vehicular room light according to a first exemplary embodiment viewed from the rear.

FIG. 1 is a perspective view of a vehicle interior C of a vehicle 1 including a vehicular room light 12 (hereinafter, merely referred to as a room light 12) according to a first exemplary embodiment viewed from the rear.

As illustrated in FIG. 1, the vehicle 1 includes a roof 2 constituting an upper portion of the vehicle interior C, an instrument panel 3 constituting a front portion of the vehicle interior C, and a center console 6 disposed between a driver seat 4 and a front passenger seat 5.

A roof console 11 is disposed at a front portion of the roof 2 and at a middle portion of the roof 2 in a vehicle width direction. The room light 12 is disposed in the roof 2 at a portion on the front side with respect to the roof console 11.

In the front portion of the roof 2, a sun visor 13 is disposed on both sides of the roof console 11 and the room light 12.

A command 15 is disposed in a front portion of the center console 6. The shift lever 15 is capable of being tilted in the front-rear direction along a guide groove 18 formed in the center console 6.

(Room Light)

Figure 2:
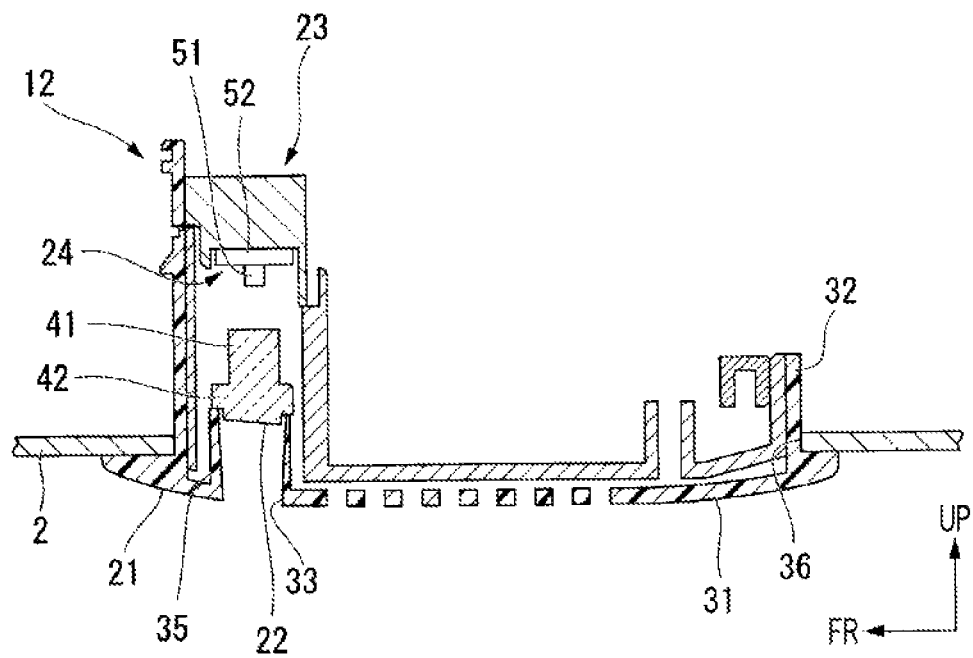
FIG. 2 is a cross-sectional view taken along line II-II in FIG. 1.

FIG. 2 is a cross-sectional view taken along line II-II in FIG. 1.

As illustrated in FIG. 2, the room light 12 is a so-called ambient lighting that spotlights, for example, a predetermined irradiation range S in the center console 6 (see FIG. 1) including the shift lever 15 described above. The room light 12 of the present exemplary embodiment includes a garnish 21, a lens 22, a base member 23, and a light source unit 24. Note that the irradiation range S and the location of the room light 12 may be changed as appropriate.

The garnish 21 includes a design portion 31 that configures the appearance of the room light 12 and an attaching portion 32 that is attached to the roof 2.

The design portion 31 has a curved shape protruding downwards. A surface (an underside) of the design portion 31 is exposed on a surface (an underside) of the roof 2. An emission opening 33 that penetrates the design portion 31 in the up-down direction is formed at a front portion of the design portion 31. A lens fixing cylindrical portion 35 oriented upwards is provided in an opening edge of the emission opening 33.

The attaching portion 32 is formed in a cylindrical shape that protrudes upwards from the outer peripheral portion of the design portion 31. The attaching portion 32 is fitted into an attachment opening 36 formed in the roof 2.

The lens 22 is formed of a material is optically transparent. The lens 22 includes a light guiding portion 41 and a flange portion 42.

The light guiding portion 41 is formed in a columnar shape extending in the up-down direction. A lower end portion (an end portion on an emission side) of the light guiding portion 41 is positioned inside an upper end portion of the lens fixing cylindrical portion 35 described above. In the example in FIG. 2, an underside (an emission surface) of the light guiding portion 41 is inclined with respect to the direction (the up-down direction) in which the light guiding portion 41 extends. On the other hand, an upper surface (an incident surface) of the light guiding portion 41 is orthogonal with respect to the direction in which the light guiding portion 41 extends.

At a lower portion of the light guiding portion 41, an outside diameter of the flange portion 42 is larger than an outside diameter of the light guiding portion 41. The flange portion 42 abuts against an upper edge of the lens fixing cylindrical portion 35 from above.

The base member 23 is attached to the garnish 21 at a portion that is above the position of the lens 22. The base member 23 is disposed above the lens 22 so as to face the lens 22.

Figure 3:
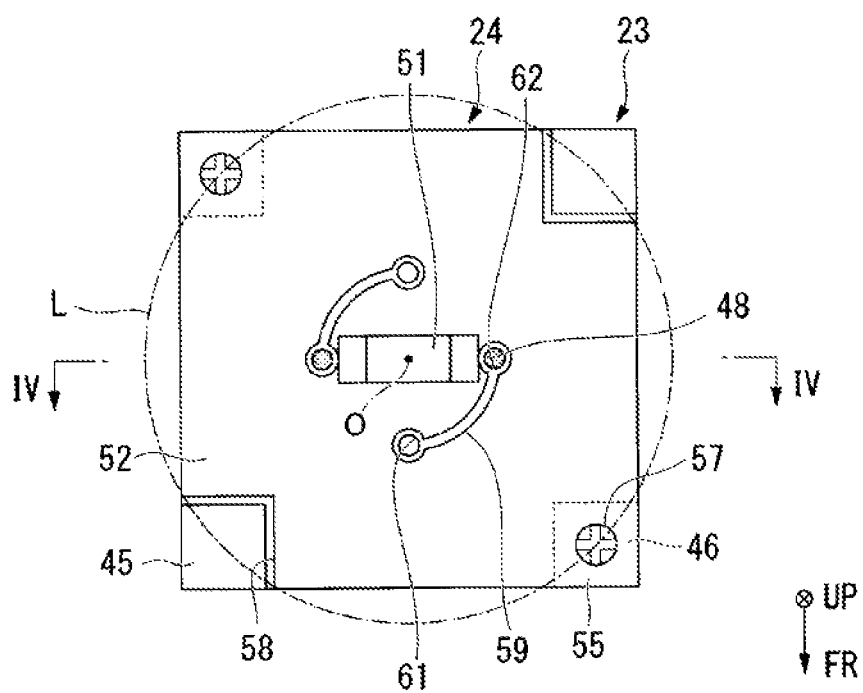
FIG. 3 is a plan view illustrating a state (an upper side installed state) in which a light source unit according to the first exemplary embodiment is attached to a base member.
Figure 4:
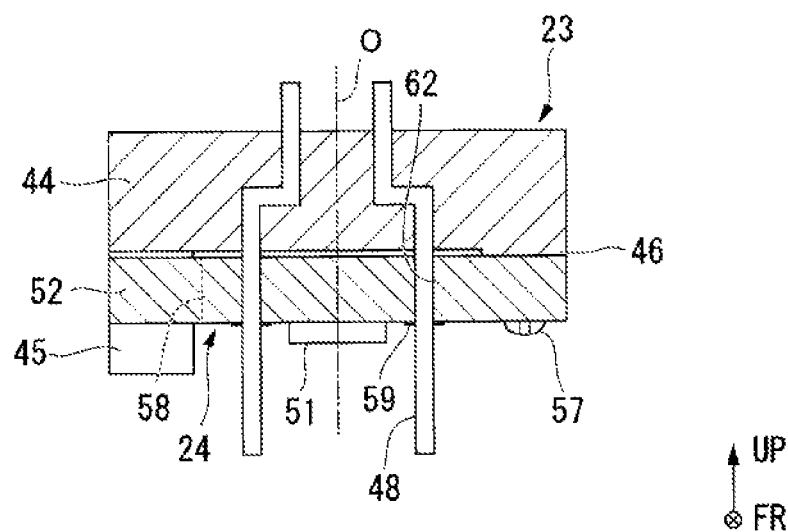
FIG. 4 is a cross-sectional view taken along line IV-IV in FIG. 3.

FIG. 3 is a plan view illustrating a state in which the light source unit 24 is attached to the base member 23. FIG. 4 is a cross-sectional view taken along line IV-IV in FIG. 3. Mote that in the following description, a state in which the upper side is installed, that is, a state in which the light source unit 24 is mounted on an upper side mounting seat 46 described later will be described as an example.

As illustrated in FIGS. 3 and 4, the base member 23 includes a base body 44 and mounting seats 45 and 46 on which the light source unit 24 is mounted.

The base body 44 is formed in a rectangular parallelepiped shape. A pair of bus bars 48 that are connected to the light source unit 24 are provided in the base body 44. Each of the bus bars 48 penetrates the base body 44 in the up-down direction. An upper end portion of each bus bar 48 is connected to an electric wire (not shown) at a portion above the base body 44.

The mounting seats 45 and 46 include lower side mounting seats 45 and upper side mounting seats 46.

The lower side mounting seats 45 are formed on a first diagonals of the base body 44. The lower side mounting seats 45 are each formed in a prismatic shape that protrudes downwards from the base body 44. A screw hole (not shown) is formed in an underside of each lower side mounting seat 45. Note that the undersides of the lower side mounting seats 45 are positioned above lower ends of the bus bars 48.

The upper side mounting seats 46 are formed on a second diagonals of the base body 44. The upper side mounting seats 46 are each formed in a prismatic shape in which the length of the downwards protrusion is smaller than that of each lower side mounting seat 45. A screw hole (not shown) is formed in an underside of each upper side mounting seat 46.

The light source unit 24 includes a light source 51 and a substrate 52 on which the light source 51 is mounted.

The external form of substrate 52 in plan view is a rectangular shape that is similar to the rectangular shape of the base body 44. The substrate 52 being stacked on the base member 23 in the up-down direction is mounted on the base member 23 from below. The first diagonals of the substrate 52 constitutes engagement portions 55 on which either of the mounting seats 45 and 46 (the upper side mounting seats 46 in the example of FIG. 3) of the mounting seats 45 and 46 are selectively mounted. The engagement portions 55 are abutted against (engaged with) the undersides of the upper side mounting seats 46 from below. A through hole (not shown) that penetrates the substrate 52 in the up-down direction is formed in each of the engagement portions 55. A screw 57 (an insertion member) is inserted in each through hole. Each screw 57 is screwed into the corresponding above-described screw hole of the upper side mounting seats 46. With the above, the substrate 52 is mounted on the base member 23.

Clearance portions 58 are formed on the second diagonals of the substrate 52. The clearance portions 58 are cutouts formed by cutting out the second diagonals of the substrate 52. Among the mounting seats 45 and 46, the clearance portions 58 avoid the lower side mounting seats 45. With the above, interference between the light source unit 24 and the lower side mounting seats 45 of the base member 23 is avoided. In other words, the clearance portions 58 are configured so that interference between the clearance portions 58 and, among the mounting seats 45 and 46, the mounting seats 45 or 46 that overlap the clearance portions 58 in the up-down direction can be avoided. Note that in the example illustrated in the drawing, the clearance portions 58 accommodate the lower side mounting seats 45 therein.

The light source 51 is mounted on an underside of the substrate 52 at a middle portion thereof in a surface direction (a direction that is orthogonal to the up-down direction). In the above case, the center of the light source 51 in the surface direction coincides with the center (hereinafter, merely referred to as a substrate center O) of the substrate 52 in the surface direction. Note that, for example, an LED is suitably used as the light source 51. However, the light source 51 is not limited to an LED.

Note that when in plan view, the engagement portions 55 and the clearance portions 58 are alternatively disposed so as to be spaced apart from each other in a circumferential direction and on a circumference of an imaginary circle L that is formed about the center of the light source 51 (the substrate center O). In the above case, each of the engagement portions 55 and each of the clearance portions 58 are positioned so as to face each other in a radial direction of the imaginary circle L.

A pair of wiring portions 59 that electrically connect the light source 51 and the bus bars 48 described above to each other are formed on the substrate 52. Each of the wiring portions 59 are formed in an arc shape that is inside the imaginary circle L in the radial direction and that extends in the circumference of the imaginary circle L. Specifically, in the substrate 52, each of the wiring portions 59 extend in the same circumferential direction of the imaginary circle L from positions that oppose each other with the light source 51 in between. Note that each wiring portion 59 is formed in a range defined by a central angle of 90° about the substrate center O.

A first through hole 61 that penetrates the substrate 52 in the up-down direction is formed on one end of each wiring portion 59 in the circumferential direction. Meanwhile, a second through hole 62 that penetrates the substrate 52 in the up-down direction is formed on the other end of each wiring portion 59 in the circumferential direction. The bus bars 48 described above are inserted into the second through holes 62 such that the light source 51 and the bus bars 48 are electrically connected to each other.

In the room light 12 configured in the above manner, as illustrated in FIG. 2, the light emitted from the light source 51 passes through the light guiding portion 41 of the lens 22 and is emitted into the vehicle interior C from the emission opening 33 of the garnish 21. With the above, as illustrated in FIG. 1, the irradiation range S of the vehicle interior C is spotlighted.

A mounting method of the room light 12 described above will be described next. Note that a mounting method of the light source unit 24 will be mainly described in the following description.

In the room light 12 of the present exemplary embodiment, the engagement portions 55 of the light source unit 24 are selectively mounted on either of the mounting seats 45 and 46 among the mounting seats 45 and 46 according to the location, the irradiation range S, and the like of the room light 12.

A case in which the light source unit 24 (the engagement portions 55) is mounted on the upper side mounting seats 46 will be described first. As illustrated in FIG. 3, when mounting the light source unit 24 on the upper side mounting seats 46, the base member 23 and the light source unit 24 are disposed so as to face each other in the up-down direction. Subsequently, the light source unit 24 is rotated with respect to the base member 23 about the substrate center O and is positioned so that the engagement portions 55 and the upper side mounting seats 46 overlap each other (at a position in which the clearance portions 58 and the lower side mounting seats 45 overlap each other). Note that when in the position at which the engagement portions 55 and the upper side mounting seats 46 overlap each other, the second through holes 62 of the substrate 52 and the bus bars 48 overlap each other in the up-down direction.

Subsequently, the light source unit 24 is moved up with respect to the base member 23 until the engagement portions 55 of the light source unit 24 abut against the upper side mounting seats 46 of the base member 23. With the above, in the light source unit 24, each bus bar 48 enters the corresponding second through hole 62 and each lower side mounting seat 45 enters the corresponding clearance portion 58. Subsequently, each engagement portion 55 of the light source unit 24 abuts against the corresponding upper side mounting seat 46 of the base member 23.

Subsequently, screws 57 are screwed into the screw holes of the upper side mounting seats 46 through the through holes of the engagement portions 55. With the above, an upper side installed state is reached in which the light source unit 24 is mounted on the base member 23 through the upper side mounting seats 46. In other words, in the upper side installed state, among the mounting seats 45 and 46, the upper side mounting seats 46 serve as first mounting seats of the present exemplary embodiment and the lower side mounting seats 45 serve as second mounting seats of the present exemplary embodiment.

Figure 5:
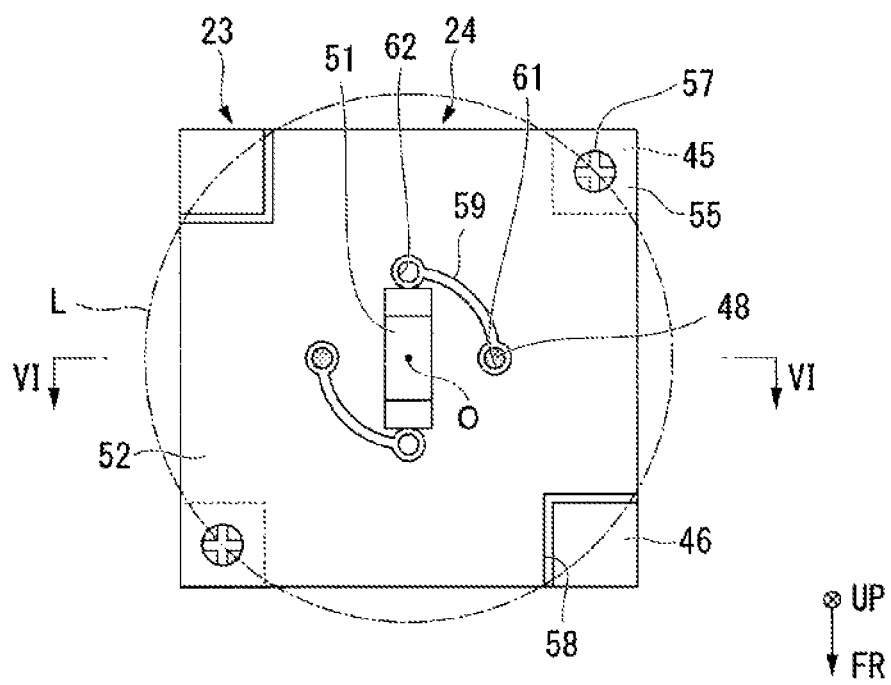
FIG. 5 is a plan view, corresponding to FIG. 3, illustrating a state (a lower side installed state) in which the light source unit according to the first exemplary embodiment is attached to the base member.
Figure 6:
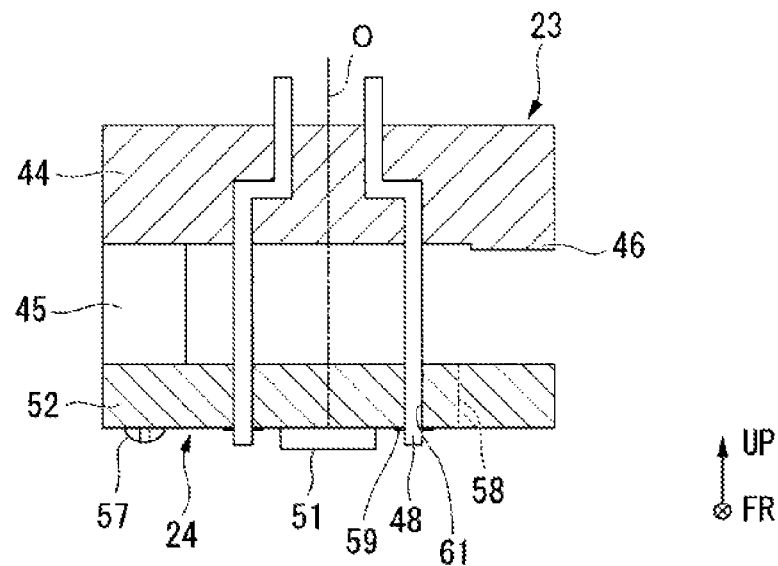
FIG. 6 is a cross-sectional view taken along line VI-VI in FIG. 5.

FIG. 5 is a plan view that corresponds to FIG. 3 and that illustrates a lower side installed state. FIG. 6 is a cross-sectional view taken along line VI-VI in FIG. 5.

As illustrated in FIGS. 5 and 6, a case in which the light source unit 24 (the engagement portions 55) is mounted on the lower side mounting seats 45 will be described next. When mounting the light source unit 24 on the lower side mounting seats 45, first, the light source unit 24 is rotated with respect to the base member 23 about the substrate center O such that the engagement portions 55 and the lower side mounting seats 45 overlap each other (at a position in which the clearance portions 58 and the upper side mounting seats 46 overlap each other).

Subsequently, the light source unit 24 is moved up with respect to the base member 23 until the engagement portions 55 of the light source unit 24 abut against the lower side mounting seats 45 of the base member 23. With the above, in the light source unit 24, each engagement portion 55 of the light source unit 24 abuts against the corresponding lower side mounting seat 45 of the base member 23 after each bus bar 48 has entered the corresponding first through hole 61.

Subsequently, screws 57 are screwed into the screw holes of the lower side mounting seats 45 through the through holes of the engagement portions 55. With the above, the lower side installed state is reached in which the light source unit 24 is mounted on the base member 23 through the lower side mounting seats 45. In other words, in the lower side installed state, among the mounting seats 45 and 46, the lower side mounting seats 45 serve as the first mounting seats of the present exemplary embodiment and the upper side mounting seats 46 serve as the second mounting seats of the present exemplary embodiment.

As described above, the light source unit 24 of the present exemplary embodiment includes engagement portions 55 that engage with either the mounting seats 45 or 46 among the mounting seats 45 and 46 provided in the base member 23, and clearance portions 58 that avoid the other mounting seats 46 or 45 among the mounting seats 45 and 46.

With the above configuration, among the mounting seats 45 and 46, the mounting seats 45 or 46 that are engaged with the engagement portions 55 are selected; accordingly, the height in which the light source unit 24 is fitted with respect to the base member 23 can be adjusted without changing the base member 23 and the light source unit 24. Furthermore, by adjusting the height in which the light source unit 24 is fitted to the base member 23, the relative position between the lens 22 and the light source 51 can be adjusted. With the above, even when the location and the irradiation area of the room light 12 are different due to the difference in vehicle type and in the color of the lighting, the light source unit 24 can be used commonly. As a result, while achieving a reduction in cost, the product marketability can be improved.

Furthermore, since the lower side mounting seats 45 are accommodated in the clearance portions 58 of the light source unit 24 in the upper side installed state, positioning of the light source unit 24 about the substrate center O with respect to the base member 23 can be performed. Accordingly, the light source unit 24 can be mounted on the base member 23 in a stable manner.

Furthermore, since the room light 12 of the present exemplary embodiment includes the light source unit 24 described above, even when the location and the irradiation area of the room light 12 are different, the light source unit 24 and the base member 23 can be used commonly. As a result, while achieving a reduction in cost, the product marketability can be improved.

Second Exemplary Embodiment

A second exemplary embodiment of the present disclosure will be described next. The present exemplary embodiment is different from the first exemplary embodiment described above in that an adjustment of a height in which a light source unit 102 is fitted to a base member 101 can be made in three stages. Note that in the following description, description of components that are similar to those of the first exemplary embodiment described above will be attached with the same reference numeral and description thereof will be omitted.

Figure 7:
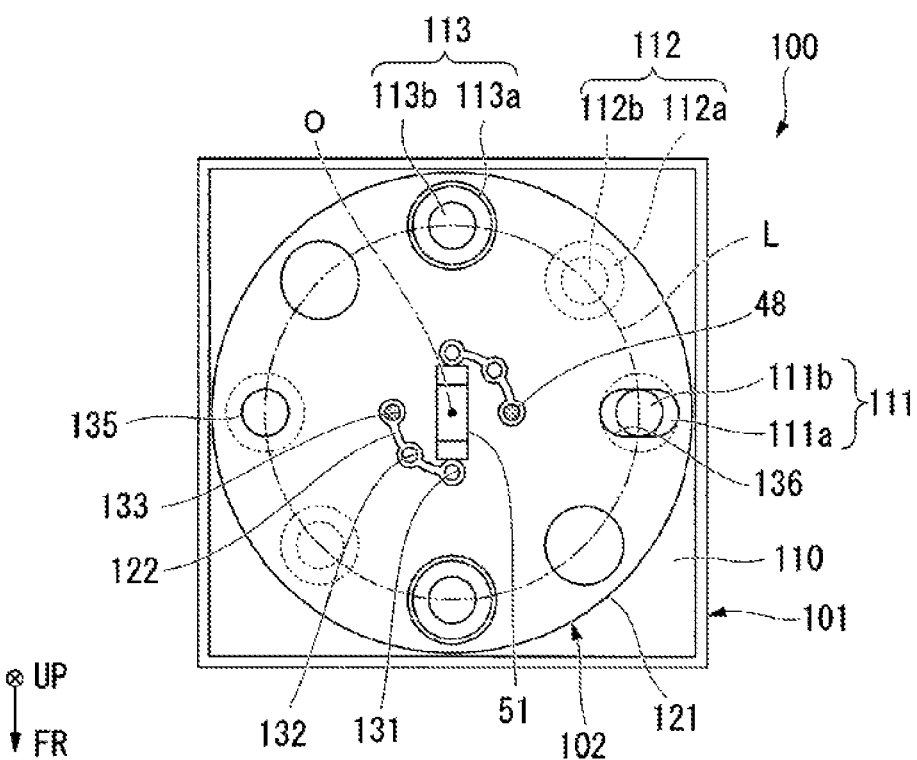
FIG. 7 is a plan view viewed from below illustrating a state (a lower side installed state) in which a light source unit according to a second exemplary embodiment is attached to a base member.
Figure 8:
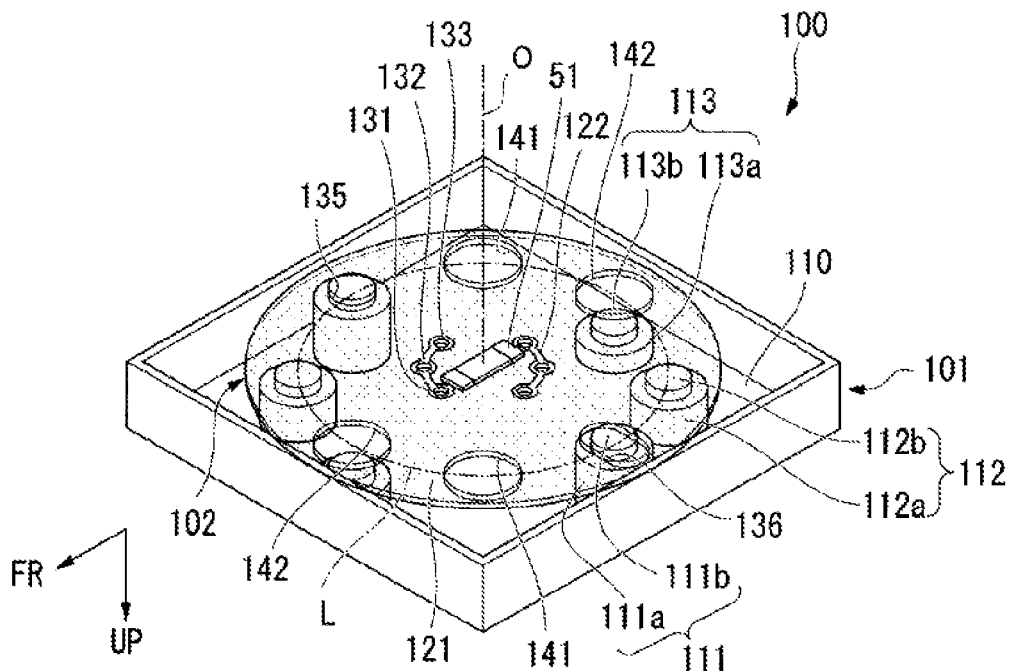
FIG. 8 is a perspective view viewed from below illustrating the state (the lower side installed state) in which the light source unit according to the second exemplary embodiment is attached to the base member.

FIG. 7 is a plan view of the base member 101 and the light source unit 102 of the second exemplary embodiment viewed from below. FIG. 8 is a perspective view of the base member 101 and the light source unit 102 of the second exemplary embodiment viewed from below. Note that in FIG. 8 and the following diagrams, the bus bars 48 described above are omitted.

As illustrated in FIGS. 7 and 8, in a room light 100 of the present exemplary embodiment, a plurality of mounting seats (lower side mounting seats 111, middle mounting seats 112, and upper side mounting seats 113) protruded downwards at different heights are provided on an underside of the base member 101 (a base body 110). The mounting seat 111, the mounting seat 112, and the mounting seat 113 included in each set of mounting seats 111 to 113 are disposed at even intervals in a circumferential direction along a circumference of an imaginary circle L and within a range defined by a central angle of 90° about the substrate center O. A pair of mounting seats 111, a pair of mounting seats 112, and a pair of mounting seats 113 are disposed such that the mounting seats in each pair face each other in the radial direction of the imaginary circle L in the base body 110.

Each lower side mounting seat 111 is formed in a columnar shape. Specifically, the lower side mounting seats 111 each include a large-diameter portion 111a that is protruded downwards from the base body 110, and a small-diameter portion 111b that has a diameter that is smaller than the diameter of the large-diameter portion 111a and that is protruded downwards from the large-diameter portion 111a.

Each middle mounting seat 112 is formed in a columnar shape. Specifically, the middle mounting seats 112 each include a large-diameter portion 112a that is protruded downwards from the base body 110, and a small-diameter portion 112b that has a diameter that is smaller than the diameter of the large-diameter portion 112a and that is protruded downwards from the large-diameter portion 112a. A lower end surface of the small-diameter portion 112b in each middle mounting seat 112 is positioned above a lower end surface of the small-diameter portion 111b of each lower side mounting seat 111.

Each upper side mounting seat 113 is formed in a columnar shape. Specifically, the upper side mounting seats 113 each include a large-diameter portion 113a that is protruded downwards from the base body 110, and a small-diameter portion 113b that has a diameter that is smaller than the diameter of the large-diameter portion 113a and that is protruded downwards from the large-diameter portion 113a. A lower end surface of the small-diameter portion 113b in each upper side mounting seat 113 is positioned above the lower end surface of the small-diameter portion 112b of each middle mounting seat 112. Note that in the mounting seats 111 to 113, outside diameters of the large-diameter portions 111a to 113a with respect each other and outside diameters of the smaller-diameter portions 111b to 113b with respect each other are the same.

When in plan view, a substrate 121 of the light source unit 102 is formed in a circular shape. The light source 51 is mounted at the substrate center O of an underside of the substrate 121. The light source 51 is connected to the bus bars 48 through a pair of wiring portions 122.

Each of the wiring portions 122 are formed in an arc shape that is inside the imaginary circle L in the radial direction and that extends in the circumference of the imaginary circle L. Specifically, in the substrate 121, each of the wiring portions 122 extend in the same circumferential direction of the imaginary circle L from positions that oppose each other with the light source 51 in between. Note that each wiring portion 122 is formed in a range defined by a central angle of 90° about the substrate center O.

A plurality of through holes 131 to 133 that penetrate the substrate 121 in the up-down direction and that are spaced apart with respect to each other in a circumferential direction of an imaginary circle L is formed in each wiring portion 122. The through holes 131 to 133 are formed at intervals of 45° in central angle about the substrate center O. Specifically, among the through holes 131 to 133, each first through hole 131 is formed on one end of the corresponding wiring portion 122 in the circumferential direction. Each second through hole 132 is formed at an intermediate portion of the corresponding wiring portion 122 in the circumferential direction. Each third through hole 133 is formed on the other end of the corresponding wiring portion 122 in the circumferential direction. The bus bars 48 described above are inserted into the third through holes 133 such that the light source 51 and the bus bars 48 are electrically connected to each other.

A pair of engagement portions 135 and 136 that selectively engage with either of the mounting seats 111 to 113 described above are formed on an outer peripheral portion (portions positioned on the circumference of the imaginary circle L) of the substrate 121. The engagement portions 135 and 136 are disposed at positions facing each other in the radial direction of the imaginary circle L with the substrate center O in between.

The engagement portions 135 among the engagement portions 135 and 136 are circular-shaped through holes in plan view. Inside diameters of the engagement portions 135 are equivalent to or larger than the outside diameters of the small-diameter portions 111b to 113b of the mounting seats 111 to 113 described above and is smaller than the outside diameters of the large-diameter portions 111a to 113a of the mounting seats 111 to 113.

The engagement portions 136 among the engagement portions 135 and 136 are elliptical through holes in which a direction of the major axis is the radial direction of the imaginary circle L in plan view. Inside diameters of the engagement portions 136 in the minor axis direction (a direction tangential to the imaginary circle L) are equivalent to or larger than the outside diameters of the small-diameter portions 111b to 113b of the mounting seats 111 to 113 described above and is smaller than the outside diameters of the large-diameter portions 111a to 113a of the mounting seats 111 to 113.

The engagement portions 135 and 136 are each individually engaged with the corresponding one of the lower side mounting seats 111. Specifically, each of the small-diameter portions 111b of the lower side mounting seats 111 is individually inserted into the corresponding one of the engagement portions 135 and 136. Note that in a state in which the engagement portions 135 and 136 are engaged with the lower side mounting seats 111, an upper surface of the substrate 121 abuts against lower end surfaces of the large-diameter portions 111a in the lower side mounting seats 111 while the middle mounting seats 112 and the upper side mounting seats 113 do not interfere with the substrate 121.

A plurality of clearance portions 141 and 142 (first clearance portions 141 and second clearance portions 142) are formed at portions on the circumference of the imaginary circle L in the substrate 121. The first clearance portions 141 are formed in the substrate 121 at positions adjacent to the engagement portions 135 and 136 described above in the circumferential direction of the imaginary circle L. The first clearance portions 141 are circular-shaped through holes in plan view. Inside diameters of the first clearance portions 141 are larger than the outside diameters of the large-diameter portions 111a to 113a of the mounting seats 111 to 113.

While having the first clearance portion 141 in between the second clearance portion 142 and the corresponding one of the engagement portions 135 and 136, each second clearance portion 142 is formed in the substrate 121 at a portion that is positioned on the opposite side of the corresponding one of the engagement portions 135 and 136 with respect to the first clearance portion 141 in the circumferential direction of the imaginary circle L. The second clearance portions 142 are circular-shaped through holes in plan view. Similar to the first clearance portions 141, inside diameters of the second clearance portions 142 are larger than the outside diameters of the large-diameter portions 111a to 113a of the mounting seats 111 to 113. Note that similar to each of the mounting seats 111 to 113 described above, the clearance portions 141 and 142 corresponding to the engagement portions 135 and 136 are disposed at even intervals in the circumferential direction along the circumference of the imaginary circle L and within a range defined by a central angle of 90° about the substrate center O.

A mounting method of the room light 100 of the present exemplary embodiment will be described next.

As illustrated in FIGS. 7 and 8, a case in which the light source unit 102 is mounted on the lower side mounting seats 111 will be described. First, the light source unit 102 is rotated with respect to the base member 101 about the substrate center O such that the engagement portions 135 and 136 and the lower side mounting seats 111 overlap each other in the up-down direction.

Subsequently, the light source unit 102 is moved up with respect to the base member 101. Then, in the light source unit 102, after the bus bars 48 enter the third through holes 133, the small-diameter portions 111b of the lower side mounting seats 111 enter the engagement portions 135 and 136. Subsequently, the upper surface of the substrate 121 abuts against the lower end surfaces of the large-diameter portions 111a of the lower side mounting seats 111 from below. In the above state, the base member 101 and the light source unit 102 are fixed with a screw (not shown) or the like. With the above, the lower side installed state is reached in which the light source unit 102 is mounted on the base member 101 through the lower side mounting seats 111. In other words, in the lower side installed state, among the mounting seats 111 to 113, the lower side mounting seats 111 serve as the first mounting seats of the present exemplary embodiment and the middle mounting seats 112 and the upper side mounting seats 113 serve as the second mounting seats of the present exemplary embodiment.

Figure 9:
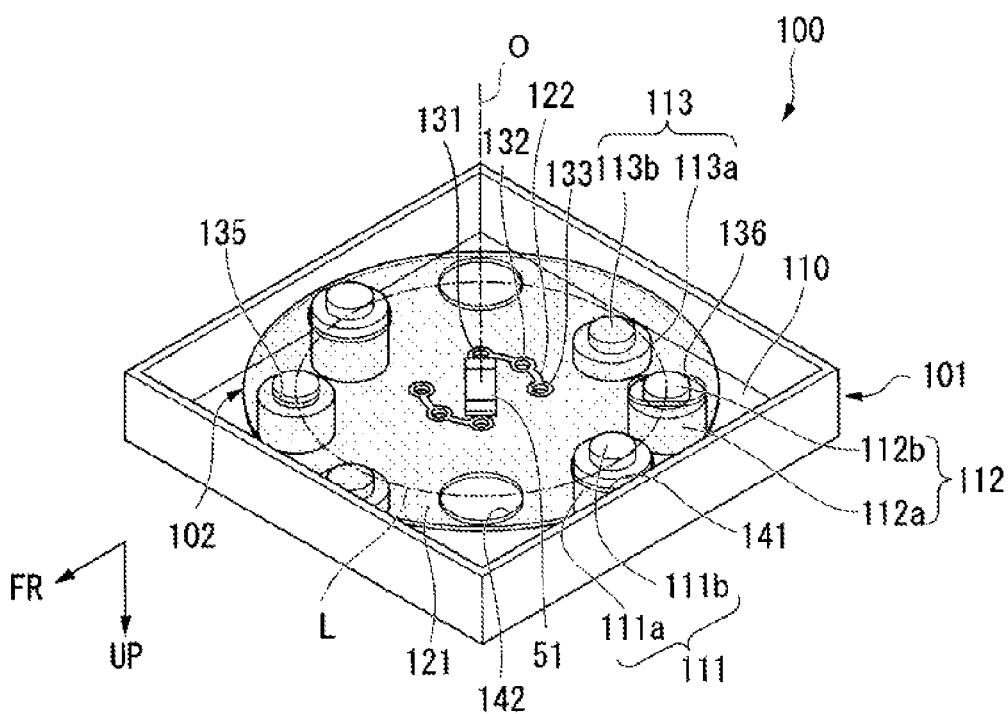
FIG. 9 is a perspective view viewed from below illustrating a state (a middle installed state) in which the light source unit according to the second exemplary embodiment is attached to the base member.

FIG. 9 is a perspective view that corresponds to FIG. 8 and that illustrates a middle installed state.

As illustrated in FIG. 9, a case in which the light source unit 102 is mounted on the middle mounting seats 112 will be described next. First, the light source unit 102 is rotated with respect to the base member 101 about the substrate center O such that the engagement portions 135 and 136 and the middle mounting seats 112 overlap each other.

Subsequently, the light source unit 102 is moved up with respect to the base member 101. Then, in the light source unit 102, after the bus bars 48 enter the second through holes 132, the lower side mounting seats 111 enter the first clearance portions 141. Subsequently, in the light source unit 102, after the small-diameter portions 112b of the middle mounting seats 112 enter the engagement portions 135 and 136, the upper surface of the substrate 121 abuts against the lower end surfaces of the large-diameter portions 111a of the middle mounting seats 112 from below. In the above state, the base member 101 and the light source unit 102 are fixed with a screw (not shown) or the like. With the above, the middle installed state is reached in which the light source unit 102 is mounted on the base member 101 through the middle mounting seats 112. In other words, in the middle installed state, among the mounting seats 111 to 113, the middle mounting seats 112 serve as the first mounting seats of the present exemplary embodiment and the lower side mounting seats 111 and the upper side mounting seats 113 serve as the second mounting seats of the present exemplary embodiment.

Figure 10:
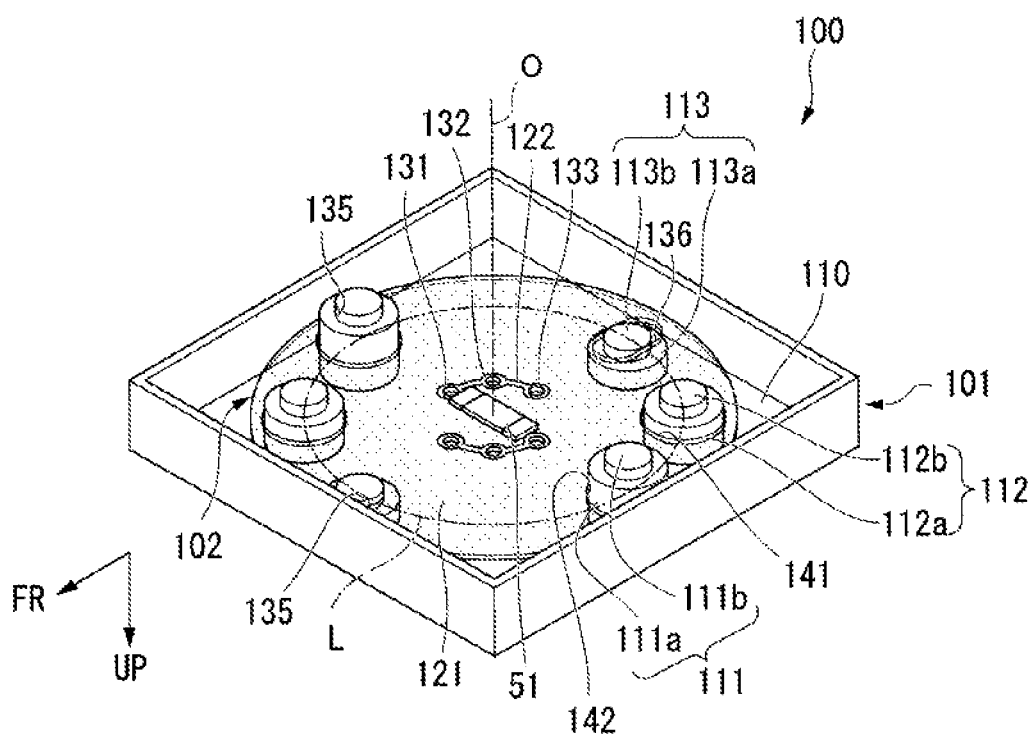
FIG. 10 is a perspective view viewed from below illustrating a state (an upper side installed state) in which the light source unit according to the second exemplary embodiment is attached to the base member.

FIG. 10 is a perspective view that corresponds to FIG. 8 and that illustrates an upper side installed state.

As illustrated in FIG. 10, a case in which the light source unit 102 is mounted on the upper side mounting seats 113 will be described next. First, the light source unit 102 is rotated with respect to the base member 101 about the substrate center O such that the engagement portions 135 and 136 and the upper side mounting seats 113 overlap each other.

Subsequently, the light source unit 102 is moved up with respect to the base member 101. Then, in the light source unit 102, after the bus bars 48 enter the first through holes 131, the lower side mounting seats 111 enter the second clearance portions 142. Then, in the light source unit 102, the middle mounting seats 112 enter the first clearance portions 141. Subsequently, in the light source unit 102, after the small-diameter portions 113b of the upper side mounting seats 113 enter the engagement portions 135 and 136, the upper surface of the substrate 121 abuts against the large-diameter portions 113a of the upper side mounting seats 113 from below. In the above state, the base member 101 and the light source unit 102 are fixed with a screw (not shown) or the like. With the above, the upper side installed state is reached in which the light source unit 102 is mounted on the base member 101 through the upper side mounting seats 113. In other words, in the upper side installed state, among the mounting seats 111 to 113, the upper side mounting seats 113 serve as the first mounting seats of the present exemplary embodiment and the lower side mounting seats 111 and the middle mounting seats 112 serve as the second mounting seats of the present exemplary embodiment.

According to the present exemplary embodiment, since the height in which the light source unit 102 is fitted to the base member 101 can be adjusted in three stages, by commonly using the components, further reduction in cost and improvement in product marketability can be achieved.

Furthermore, in the present exemplary embodiment, since the engagement portion 136 is formed as a long hole in which the direction of the major axis is the radial direction of the imaginary circle L, positional displacement of the light source unit 102 in the radial direction with respect to the base member 101 can be tolerated.

Note that the technical scope of the present disclosure is not limited to the exemplary embodiments described above and various modification of the exemplary embodiments described above within the purport of the present disclosure is included in the technical scope. In other words, the configurations and the like included in the exemplary embodiments described above is merely an example and modifications thereof can be made as appropriate.

For example, in the exemplary embodiments described above, configurations that enable the height, in which the light source unit is fitted to the base member, to be adjusted in two or three stages have been described; however, not limited to the above, the height may be adjusted in four or more stages.

In the exemplary embodiments described above, a case in which the center of the light source coincides with the substrate center O has been described; however, the present disclosure is not limited to the above. In other words, it is only sufficient that the engagement portions, the clearance portions, and each of the mounting seats are disposed on the circumference of the imaginary circle L formed about the center of the light source.

Furthermore, the design may be change appropriately such that the method in which the engagement portions and the mounting seats are engaged is changed.

In the exemplary embodiments described above, a configuration in which the wiring portions are provided inside the imaginary circle L has been described; however, not limited to the above, the wiring portions may be provided outside the imaginary circle L.

In the exemplary embodiments described above, a case in which mounting seats with different heights are disposed on the base member and in which engagement portions that engage with the mounting seats and clearance portions that avoid the mounting seats are formed in the substrate has been described; however, the present disclosure is not limited to the above. In other words, mounting seats with different height may be disposed on the substrate, and engagement portions that engage with the mounting seats and clearance portions that avoid the mounting seats may be formed in the base member.

The above is also capable of exerting similar advantageous effects as those of the exemplary embodiments described above.

Other than the above, within the scope of the purport of the present disclosure, the components of the exemplary embodiments described above may be appropriately replaced with known components and the modifications described above may be appropriately combined.

What is claimed is:
1. A light source unit comprising:
a light source that emits light into a vehicle interior through a lens of a vehicular room light;
a substrate on which the light source is mounted and which has an engagement portion at a predetermined circumferential position on an imaginary circle line centered at the light source;

a base member of the vehicular room light having first and second mounting seats protruding from a surface of the base member to which the substrate is mounted, the first and second mounting seats being provided at respective predetermined circumferential positions on the imaginary circle line centered at the light source such that the engagement portion of the substrate can selectively be seated on and engaged with one of the first and second mounting seat, the first and second mounting seats having different protrusion heights from each other such that the protrusion height of the first mounting seat is smaller than the protrusion height of the second mounting seat; and wherein the substrate further comprises a clearance portion that allows the substrate to avoid interference with the second mounting seat of the base member when the engagement portion of the substrate is seated on the first mounting seat.

2. The light source unit according to claim 1, wherein the engagement portion comprises an insertion member and an elongated hole to receive the insertion member, which are respectively provided with the substrate and the base member, so as to fix the substrate to the base member, a direction of a major axis of the elongated hole being a radial direction of the imaginary circle.

3. A vehicular room light comprising the light source unit according to claim 1.

4. The light source unit according to claim 1, wherein the clearance portion is a cutout or a hole forming a hollow space that avoids the interference with any one of the mounting seats that is aligned with the clearance portion in a height direction of the mounting seats when the substrate is mounted to the base member.

5. A light source unit comprising:
a light source that emits light into a vehicle interior through a lens of a vehicular room light;
a substrate on which the light source is mounted; and
a base member of the vehicular room light to which the substrate is mounted, the base member having an engagement portion and clearance portions, wherein the substrate has a plurality of mounting seats protruding from a surface of the substrate that have different protrusion heights from one another and are disposed so as to be spaced apart from one another on an imaginary circle line centered at the light source such that one of the mounting seats of the substrate can selectively be engaged with the engagement portion of the base member, the mounting seats comprising at least a first mounting seat and a second mounting seat, the protrusion height of the first mounting seat being smaller than the protrusion height of the second mounting seat, and the base member has the clearance portions at positions that overlap, in a height direction of the mounting seats, positions of the mounting seats which are not engaging with the engagement portion, thereby avoiding interference between these mounting seats and the base member, while allowing said one of the mounting seats to be engaged with the engagement portion, such that one of the clearance portions allows the base member to avoid interference with the second mounting seat when the engagement portion is seated on the first mounting seat.

6. A vehicular room light comprising the light source unit according to claim 5.

7. The light source unit according to claim 5, wherein the clearance portion is a cutout or a hole forming a hollow space that avoids the interference with any one of the mounting seats that is aligned with the clearance portion in the height direction when the substrate is mounted to the base member.

* * * * *